US007451278B2

(12) United States Patent
Feind et al.

(10) Patent No.: US 7,451,278 B2
(45) Date of Patent: Nov. 11, 2008

(54) GLOBAL POINTERS FOR SCALABLE PARALLEL APPLICATIONS

(75) Inventors: Karl Feind, Bloomington, MN (US); Kim McMahon, Apple Valley, MN (US); Dean Nelson, Eagan, MN (US); Dean Roe, Apple Valley, MN (US); Dan Higgins, Eagan, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 531 days.

(21) Appl. No.: 10/365,658

(22) Filed: Feb. 13, 2003

(65) Prior Publication Data
US 2004/0162952 A1 Aug. 19, 2004

(51) Int. Cl.
G06F 9/54 (2006.01)
(52) U.S. Cl. .................... 711/147; 711/202; 719/313
(58) Field of Classification Search ............. 711/147, 711/202; 719/313
See application file for complete search history.

(56) References Cited

U.S. PATENT DOCUMENTS 5,845,331 A * 12/1998 Carter et al. ............... 711/163
6,212,617 B1 * 4/2001 Hardwick .................. 712/3

OTHER PUBLICATIONS

Goodheart, Berny and Cox, James; The Magic Garden Explained: The Internals of UNIX System V Release 4; 1994; Prentice Hall of Australia Pty Ltd; pp. 12, 25, 129-134, 144-147, 252-257, 551-559.*
MPI-2: Extensions to the Message-Passing Interface; Sep. 10, 2001; Message Passing Interface Forum; available at http://www-unix.mcs.anl.gov/mpi/mpi-standard/mpi-report-2.0/mpi2-report.htm; Sections 6.3.1 Put.*
Tanenbaum, Modern Operating Systems, 2001, Prentice-Hall Inc., second edition, pp. 681, 692-693, 700-710, 710-712.*
Message Passing Interface (MPI) FAQ, http://www.faqs.org/faqs/mpi-faq/, retreived from internet Apr. 2, 2007, published May 2, 1999, pp. 1-10.*
Lee et al., An Efficient, Protected Message Interface, IEEE, Nov. 1998, Computer, vol. 31 No. 11, pp. 69-75.*

(Continued)

*Primary Examiner*—Kevin Ellis
*Assistant Examiner*—Jared I Rutz
(74) *Attorney, Agent, or Firm*—Staas & Halsey LLP (57) ABSTRACT

Mapping of cacheable memory pages from other processes in a parallel job provides a very efficient mechanism for interprocess communication. A trivial address computation can then be used to look up a virtual address that allows the use of cacheable loads and stores to directly access or update the memory of other processes in the job for communication purposes. When an interconnection network permits the cacheable access of one host's memory from another host in the cluster, kernel and library software can map memory from processes on other hosts, in addition to the memory on the same host. This mapping can be done at the start of a parallel job using a system library interface. A function in an application programming interface provides a user-level, fast lookup of a virtual address that references data regions residing on all of the processes in a parallel job running across multiple hosts.

37 Claims, 6 Drawing Sheets

OTHER PUBLICATIONS

Tanenbaum, Modern Operating Systems, 2001, Prentice-Hall Inc., second edition, p. 23.*

Fillo et al., The M-Machine Multicomputer, Proceedings of the 28th annual international symposium on Microarchitecture, IEEE Computer Society Press, 1995, pp. 146-156.*

Tanenbaum, Andrew S. and Van Steen, Maarten, Distributed Systems Principles and Paradigms, 2002, Prentice-Hall Inc., pp. 16-19 and 28-31.*

Global Arrays, www.emsl.pnl.gov:2080/docs/global/ printed on Jan. 29, 2003, 5 pp.

J. Nieplocha et al., "The Global Array Programming Model for High Performance Scientific Computing", SIAM News, Aug./Sep. 1995, pp. 1-9.

J. Nieplocha et al., "Global Arrays: A Non-Uniform-Memory-Access Programming Model for High-Performance Computers", The Journal of Supercomputing, vol. 10, 1996, 169-189, pp. 1-17.

J. Nieplocha et al., "Global Arrays: A Portable "Shared-Memory" Programming Model for Distributed Memory Computers" pp. 1-10.

J. Taft, "Achieving 60 GFLOP/s on the production CFD code Overflow-MLP", PARCO Journal, Article No. 1587, Dec. 15, 2000, pp. 1-16.

M. Snir, et al., "MPI The Complete Reference", 1996.

* cited by examiner

GLOBAL POINTERS FOR SCALABLE PARALLEL APPLICATIONS

BACKGROUND OF THE INVENTION

1. Field of the Invention

The present invention is directed to sharing memory by parallel executing processes and, more particularly, to accessing cacheable memory across partitions in a multi-host parallel processing system.

2. Description of the Related Art

There are a number of parallel programming models currently or recently in use. These include the Message Passing Interface (both MPI-1 and MPI-2) as described in, e.g., *MPI: The Complete Reference* by Snir, et al. published in 1996 by the Massachusetts Institute of Technology; Multi-Level Parallelism (MLP) as used by the National Aeronautics and Space Administration and described in the Dec. 15, 2000 *Parallel Computing* journal published by Elsevier; OpenMP; CoArray Fortran; and High Performance Fortran (HPF); as well as proprietary multi-processing programming models, such as SHMEM which originated from Cray Research, Inc. and is currently available from Silicon Graphics, Inc. (SGI) of Mountain View, Calif.

Another example is the Global Arrays (GA) toolkit which is in the public domain and is available from the William R. Wiley Environmental Molecular Sciences Laboratory at the Pacific Northwest National Laboratory (PNNL) in Richland, Wash. The GA toolkit is compatible with MPI and provides a portable "shared-memory" programming interface for distributed-memory computers. Using GAs, each process in a multiple instruction/multiple data (MIMD) parallel program can asynchronously access logical blocks of physically distributed dense multi-dimensional arrays using library calls. The GA model exposes to the programmer the non-uniform memory access (NUMA) characteristics of high performance computers and acknowledges that access to a remote portion of the shared data is slower than to the local portion.

Some of these multi-processing programming models, such as MLP and OpenMP have only been implemented on hardware with a single system image (single-host). The others have been implemented on clusters (multi-host) with between 100 to 6,000 or more processors per cluster to provide massively parallel processing capability. All of these multi-processing programming models utilize alternating computation and communication phases. The more time required for communication, the less efficient and less scalable the model.

The multi-processing programming models described above utilize one or more of the following types of communication. In generally increasing efficiency these types are send/receive, put/get and load/store. Conventionally, the most efficient, load/store, has only been available in single-host systems using MLP, OpenMP or SHMEM/XPMEM. The MPI-1 multi-processing programming model utilizes only send/receive which requires hand-shaking between processes. Library calls and hand-shaking are avoided in load/store data transfers, thereby minimizing overhead. However, load/store data transfers require access to shared memory that has previously been difficult to implement in a multi-host system.

SUMMARY OF THE INVENTION

It is an aspect of the present invention to provide faster communication between hosts in a parallel processing computer system.

It is another aspect of the present invention to provide communication between partitions of cacheable memory in a parallel processing computer system with low latency and high bandwidth performance.

It is a further aspect of the present invention to provide communication between partitions of cacheable memory in a parallel processing computer system without a subroutine call and without the use of memory mapped registers.

It is yet another aspect of the present invention to provide a mechanism for memory mapping across partitions of cacheable memory in a parallel processing computer system.

It is a yet further aspect of the present invention to permit generated code from existing compilers to access remote memory efficiently.

It is yet another aspect of the present invention to enable existing compilers to generate efficient code for accessing small-strided transfers by built-in processor queues that allow multiple loads or stores to be operating concurrently.

It is a yet further aspect of the present invention to provide data access flexibility to facilitate load balancing.

The above aspects can be attained by a method of implementing a multi-processing programming model that provides access to memory cached by cooperating processes executing on multiple hosts. The method makes all memory assigned to any of the cooperating processes accessible to any of the processes by using pointers that are unique across all hosts. This is accomplished by mapping portions of the memory, including both segments of virtual memory fixed in size and changeable in size, upon initial start up of each process for subsequent inter-host access. The method also includes transferring messages through mapped memory regions via a single inter-host copy request from a user process. Preferably the areas of memory are transferred via user-level loop load/store operations on cacheable memory.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
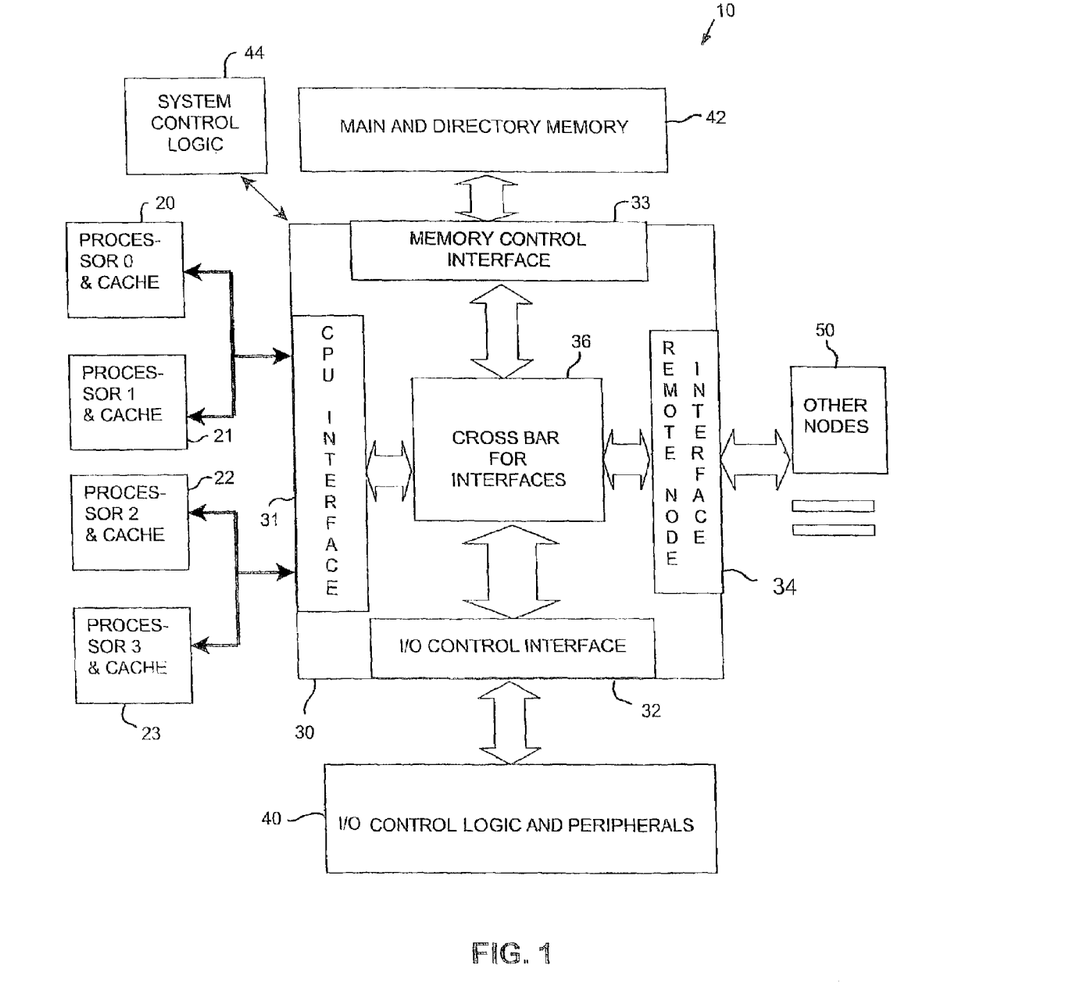
FIG. 1 is a block diagram of a processing node in a scalable computing system to which the present invention can be applied.

Following is a glossary of abbreviations used herein.
BTE—block transfer engine
CC-NUMA—cache coherent—non-uniform memory access
HPF—High Performance Fortran
MLP—Multi-Level Parallelism, a multi-processing programming model
MPI—Message Passing Interface, a multi-processing programming model
MPI-1—original MPI specification with messages transmitted by send/receive only
MPI-2—revised MPI specification including messages transmitted by put/get
NUMAlink™—an interconnect used by CC-NUMA computers using load/get communication
OpenMP—a standardized multi-processing programming model
SHMEM—a multi-processing programming model developed by Cray Research
XPC—cross partition communication An example of a processing node 10 in a scalable computing system to which the present invention can be applied is illustrated in FIG. 1. In this example, four processors 20-23, including cache memory, are coupled to bedrock components 30. The bedrock components 30 include four interfaces 31-34 and a crossbar 36 connecting the interfaces. CPU interface 31 is coupled to the processors 20-23. Input/output control interface 32 is connected to input/output control logic and peripherals 40. Memory control interface 33 is connected to main and directory memory 42. System control logic 44 provides control of the bedrock components 30. Remote node interface 34 provides a connection to other nodes 50, e.g., via a NUMAlink™ (not shown).

Memory control interface 33 provides a hardware firewall. Physical memory 42 of a scalable node system is divided up such that, for X nodes, each node contains (1/X) of the total system's physical memory 42. Thus, each node, like node 10 illustrated in FIG. 1, maintains the memory directory 42 for its (1/X) of the system's memory using memory protection masks (not shown separately). The memory protection masks control access to cache lines of memory, where, for example, there may be 128 cache lines per page of memory. It does not matter from where the accessers of this (1/X) memory are located (on this node, or on a different node on this or on another partition) or how many there are in a partition. Once the hardware firewall for an area of memory has been "opened" in the memory directory for access from another partition, it is accessible to all processes on that partition that have been informed how to access it, as discussed below.

Conventionally, cross partition communication between processes operating under a multi-processing programming model executing on a cluster of nodes requires send/receive hand-shaking or put/get communications, both of which would use I/O control interface 32 and logic peripherals 40, e.g., including an Ethernet link (not shown) of node 10 illustrated in FIG. 1. However, according to the present invention inter-host communication uses remote node interface 34 to communicate with other nodes 50, e.g., via a NUMAlink™ connection.

The hardware illustrated in FIG. 1 may be operated to permit a process in one partition to access memory in the virtual address space of a process in a different partition with low latency and high bandwidth performance. The invention is not limited to the illustrated architecture, but can be applied to many different hardware architectures executing user applications in different partitions and is particularly relevant to scalable node architectures. It is common for scalable node architectures to have the capability of being partitioned into multiple independent systems. In the most secure systems, the partitions are separated by hardware firewalls, where the address space for each host is defined by hardware registers used solely for this purpose, e.g., in memory control interface 33. Hardware and operating system software can set the limits of the partitions and permit communication across partitions, but application software has no direct access to the hardware registers forming the firewall.

Figure 2:
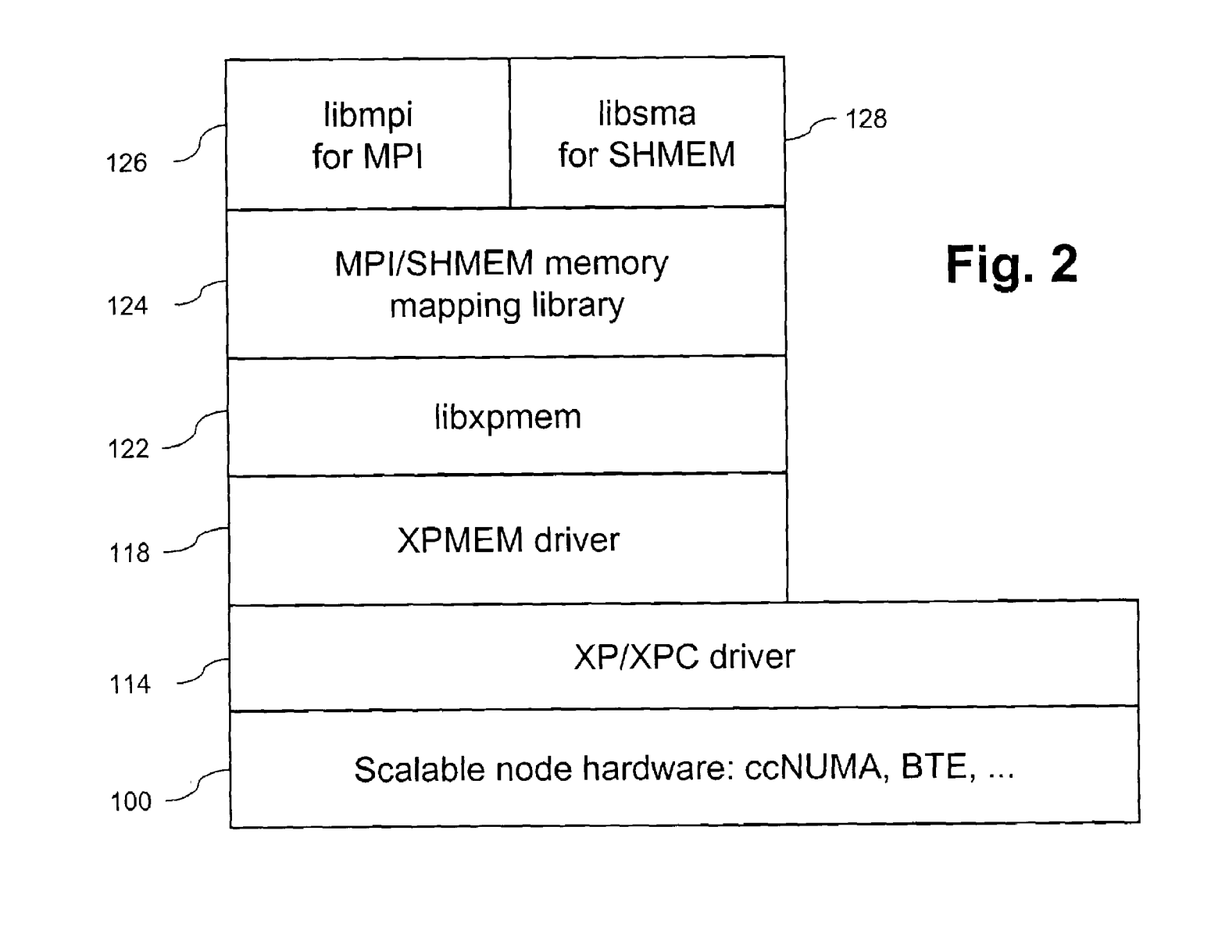
FIG. 2 is a block diagram of software layers in a multi-host system incorporating the present invention.

A block diagram illustrating the relationship between user applications and partitioning drivers is illustrated in FIG. 2. Scalable node architecture, such as computer systems available from SGI include hardware that provides a block transfer engine (BTE) 100. In the processing node illustrated in FIG. 1, BTE hardware is included in I/O control interface 32. Block transfer engines can be viewed as cache-coherent direct memory access (DMA) engines. Once initiated, BTE data transfers do not require processor resources and they can be performed across partition boundaries.

The present invention makes use of block transfer engines (BTEs) to copy areas of memory in a separate partition almost as easily as memory within the same partition of a scalable node system, via fast system calls. However, unlike load/store operations, BTE transfers require cache line alignment and a system call. In addition the present invention makes it possible to share memory accessed via load/store operations in generated code.

The capabilities described above is accomplished by providing a set of library functions and other operating system software to access memory belonging to processes executing on a scalable node system. The relationship between this software and user processes is illustrated in FIG. 2 where a horizontal line designates a direct relationship and dependency between objects on either side of the horizontal line (the vertical borders in FIG. 2 are not indicative of any relationship). A BTE driver (not shown) is provided in system space for BTE hardware 100. Cross partition communication (XP/XPC) driver 114 provides cross-partition communication using BTE hardware in I/O control interface 32. XP/XPC driver 114 is available in conventional SGI scalable node systems and similar drivers exist in similar architectures from other computer system manufacturers. However, no known operating system provides XPMEM driver 118 or function library (libxpmem) 122 and MPI/SHMEM memory mapping library 124 in user space to provide easy access to a cross partition driver for user processes in the manner described below.

To enable cross-partition or inter-host communication, XPMEM driver/library 118, 122 has to know where to find the memory area in the virtual address space of a process. To provide the most efficient way to allow a multi-processing program model to access cacheable memory across a multi-host system, a sequence of memory mapping operations are preferably performed at the user process initialization time using MPI/SHMEM memory mapping library 124. Thereafter, user processes have access to the Message Passing Interface (MPI) and SHMEM parallel programming models by calling functions in libmpi 126 and libsma 128, respectively. To allow the most flexible cross-partition communication using the MPI and SHMEM parallel programming models, five segments of memory are mapped during user process initialization. These segments are the static area, private heap, symmetric heap, stack area and internal MPI buffers.

Since several of these segments (the private heap, symmetric heap, and stack area) can grow dynamically based on user application design, the exact sizes of these regions to map at initialization time is not known. To accommodate this, each process requests a large potential address region for the mapped heaps and stack. These large regions are not faulted in at initialization time, as described below with respect to FIG. 4, to prevent excess memory consumption if the user application never accesses these regions. The size of the static region and internal MPI buffers can be determined empirically at initialization time.

As each MPI or SHMEM process starts up, it communicates the starting address and size of each of the five memory segments to be mapped, to all other processes in the multi-processing program model. Each process then maps (or attaches) the five memory segments of all the remote processes onto the current process' virtual memory region. This mapping sequence is performed by making calls to functions in the XPMEM library.

These initialization operations create the complete layout of the memory mapping for cross-partition or inter-host communication. Given this layout, each process can compute the virtual address of a corresponding memory location on a remote process by a simple formula or table look up. A formula is preferred for faster execution. Generally speaking, the formula takes into consideration the base address of the local memory mapping, the type of memory, and the remote process rank.

Figure 3A:
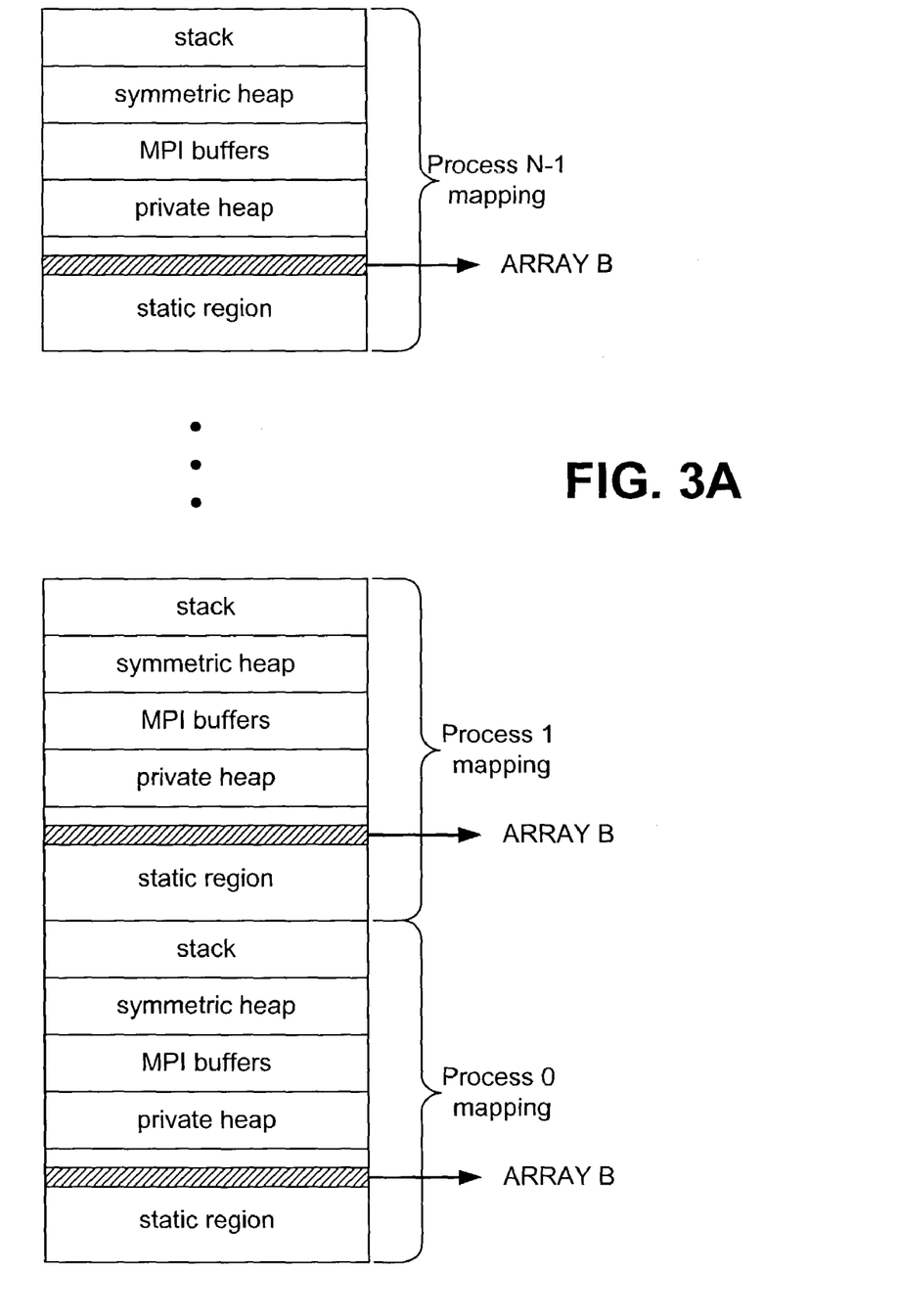
FIG. 3A is a block diagram of memory showing cross mapping of five memory segments of multiple processes onto the virtual address space of a single process.

FIG. 3A is an illustration of this memory mapping using XPMEM for the virtual address space of a single process. For example, assume Array B is defined as a global (static) array in each of the processes. Once the initial memory mapping is complete, process 1 can compute the local virtual address of an element of Array B on remote process 3 by a simple formula. Once this address is computed, process 1 can perform conventional loads and stores to this address without the use of subroutine call, memory mapped registers, or any interaction from the remote process. Likewise, this technique can be used for any symmetric data segment, whether the processes reside on a single system image or across partitions.

Figure 3B:
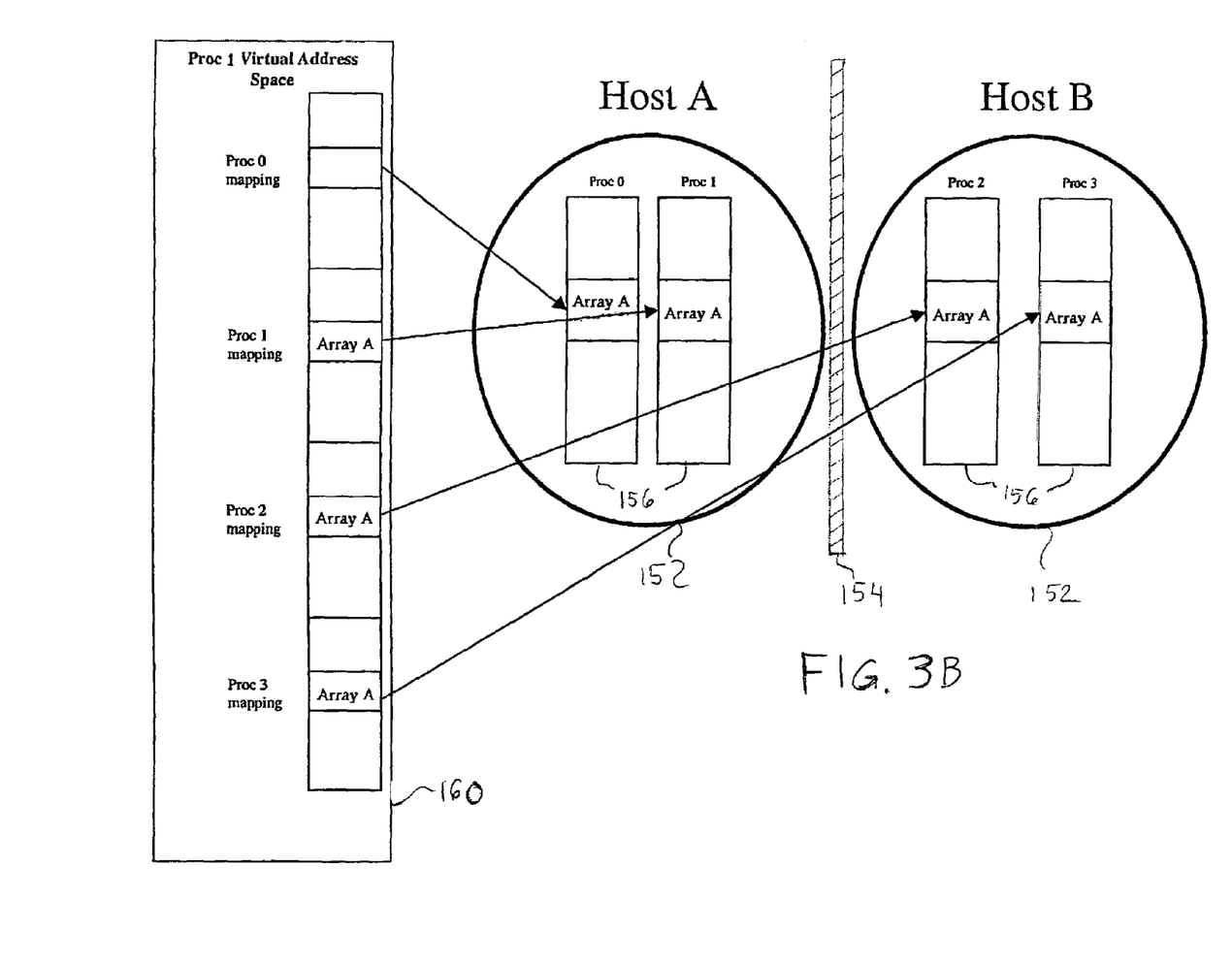
FIG. 3B is a block diagram of memory showing mapping of instantiations of a single array in a plurality of processes into virtual address space of a single process.

A simplified example of memory mapping in a partitioned scalable node system for two hosts 152 is illustrated in FIG. 3B. Hosts A and B are separated by firewall 154. Each host 152 is illustrated as executing two processes 156. Process 0 and process 1 are running on host A and process 2 and process 3 are running on host B. Each process has virtual address space assigned in a manner like that of the virtual address space 160 for process 1. FIG. 3B shows how a symmetric data segment, Array A, has been mapped into the other processes' virtual memory for later lookup by global pointer function.

In FIG. 3B, a symmetric data segment (Array A) is mapped into virtual address space 160 of each process for later lookup by a user-level library function called shmem_ptr. This particular library function provides a fast address lookup for "symmetric" data segments only. Either a table look up, or a formula could be used, but a formula is preferred for faster execution. A symmetric data segment is one that exists with the same size and relative offset for all processes. The two symmetric data segments in UNIX systems, such as IRIX, are static memory and symmetric heap.

Figure 4:
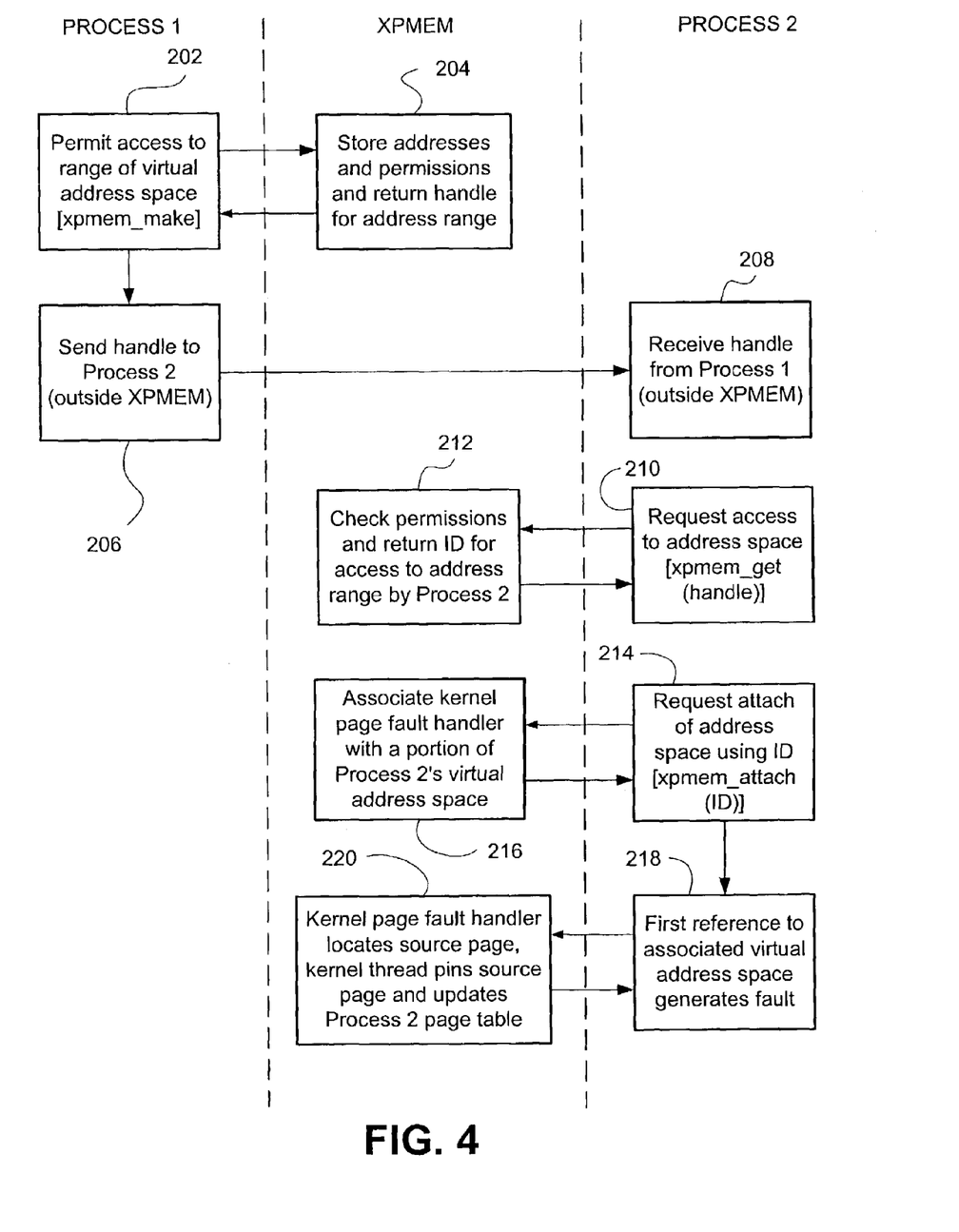
FIG. 4 is a multi-process operation diagram of operations performed by two processes, a system library, and a driver to obtain access to data across a hardware firewall.

To perform a copy operation via XPMEM as illustrated in FIG. 4, a handle and identifier must be created for the copy destination in addition to the handle and identifier obtained for the copy source as described above. Process 1 permits 202 access to a range of virtual address space by calling a function (xpmem_make) in XPMEM library 122. XPMEM driver 118 stores 204 addresses and permissions defined by process 1 in the xpmem_make function call and returns a handle for the address range that can be used in subsequent calls to XPMEM. Process 1 then sends 206 the handle to other process(es) using conventional inter-host communication channels, such as a TCP/IP Ethernet-based socket connection. Process 2, for example, receives 208 the handle from process 1.

To establish access to the address space of process 1, process 2 requests 210 access via function call xpmem_get in XPMEM library 122 in user space 120 of the host on which process 2 is running. In response, XPMEM driver 118 checks 212 the permissions stored 204 previously and returns an identifier for access to the address range by process 2. By separating the permissions check from access operations, it is unnecessary to check credentials on each access. If another process wants access to the virtual address space of process 1, library function xpmem_get is called using the same handle as an argument, but a different identifier is returned. XPMEM keeps track of which processes access which address spaces using the identifiers.

If process 2 receives permission to access the virtual address space of process 1, process 2 can request a copy of the data using BTE hardware as described below, or can request 214 that the address space be mapped for sharing by calling the xpmem_attach function in XPMEM library 122 using the identifier returned by XPMEM driver 118. In response to an attach request 214, XPMEM driver 118 associates 216 a kernel page fault handler with a portion of process 2's virtual address space.

To perform a copy operation via XPMEM, a handle and identifier must be created for the copy destination in addition to handle obtained for the copy source as described above. The handle is created via xpmem_make( ) and the identifier is created via xpmem_get( ) both using the destination process' address space to obtain the handle and request permission to access the memory. After the identifiers for the source and destination are known, one process calls xpmem_copy( ) specifying both identifiers and a length as arguments. XPMEM driver 118 translates these identifiers to blocks of physical memory to be copied from source to destination, thereby copying a portion of the virtual address space for the source process to the virtual address space of the destination process.

The result of the association 216 is illustrated in FIG. 3B. Virtual address space 160 for process 1 includes mapping of array A in each of processes 0-3. However, at this point in time only the virtual address space of process 1 contains page table mappings to array A. The first reference to the virtual address space of process 2 associated with array A generates 218 a fault. Due to the association 216 performed by XPMEM, the kernel fault handler, is initiated to locate 220 the source page. The kernel fault handler therefore calls XPMEM driver 118 to pin the source page and update the page table of process 2 to access the source page.

Subsequent accesses to the virtual address space of process 1 may be performed by load/store operations. This makes the process of accessing the memory area in the virtual address space of process 1 very efficient for compiled programs written in, e.g., C or Fortran. Load/store operations are normal reads/writes to memory through any dereference or assignment methods available in any programming language. In C for example, a variable x could be defined to be a pointer to a location in a process' own virtual address space. This virtual address space could actually be XPMEM-attach memory which maps to another process' address space. Reading from that process' address space (a load) would be as simple as dereferencing the variable x itself. Writing to that process' address space (a store) would be as simple as storing a new value to the location which the variable x represents.

Figure 5A:
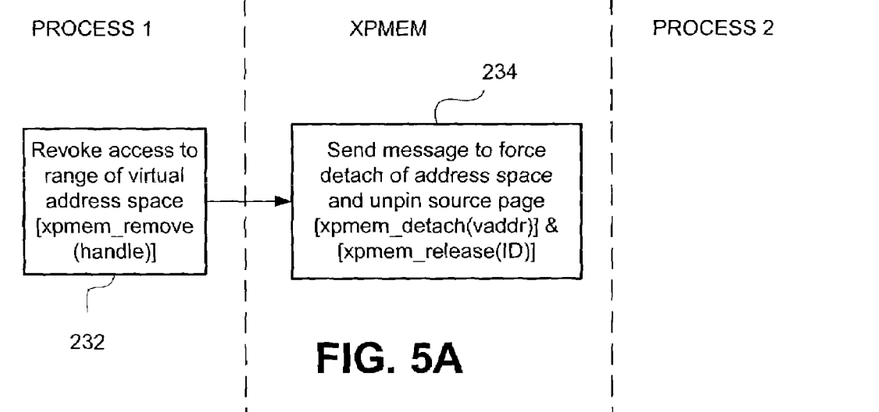
FIGS. 5A-5C are multi-process operation diagrams of operations performed in breaking down access to data across a hardware firewall.

If process 1 is to discontinue sharing the range of virtual address space previously permitted 202, e.g., when process 1 is being terminated or process 1 performs an xpmem_remove( ) operation, the procedure illustrated in FIG. 5A is performed. Process 1 revokes 232 access to the range of virtual address space by calling function xpmem_remove in XPMEM library 122. In response, XPMEM driver 118 sends 234 a message to all processes to detach and release the address space. The xpmem_remove( ) operation results in an XPC message being sent to all partitions which have processes attached to the source address space range. Upon receipt of this message on the remote partition, a separate XPMEM kernel thread is created which effectively does the xpmem_detach( ) and xpmem_release( ) operations on behalf of the process which originally did the xpmem_get( ) and xpmem_attach( ) in the first place. If the process should then try to use that previously attached memory, it will fail as a valid physical translation is no longer available for that virtual address range. Once all processes attached to the virtual address segment being removed have completed these steps, XPMEM driver 118 unpins 234 the underlying physical page(s) of the source process to permit swapping.

Figure 5B:
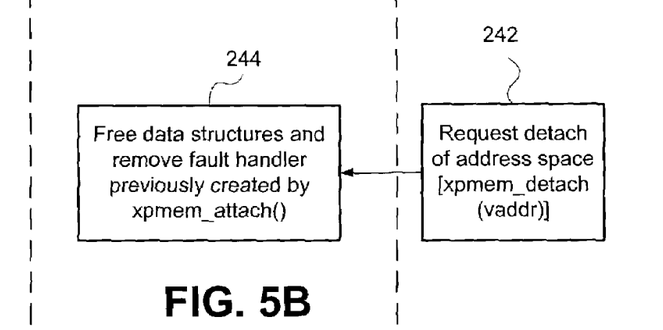

As illustrated in FIG. 5B, process 2 (or any other process that has established access to the virtual address space) requests 242 detachment of the address space by calling xpmem_detach using as an argument the virtual address in the virtual space of process 2.

Figure 5C:
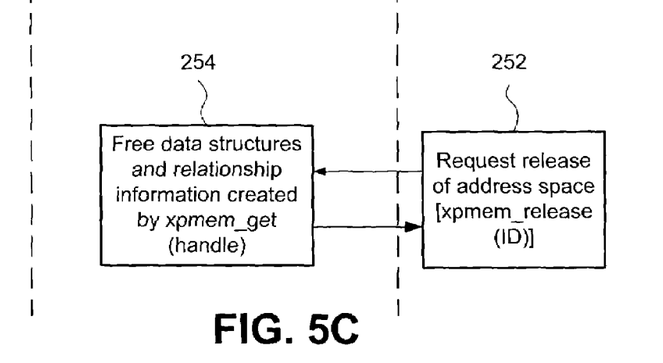

The process of releasing is illustrated in FIG. 5C. Process 2 (or any other process that has detached the previously detached address space of processor 1) requests 252 release of the address space by calling xpmem_release in XPMEM library 122 using its identifier for the virtual address space. In response, XPMEM frees 254 data structures and relationship information created by the function call xpmem_get.

The present invention has been described primarily with respect to a CC-NUMA system running IRIX or LINUX and using a proprietary shared memory programming model for multi-host parallel processing. However, the present invention is not limited to this operating environment and can be advantageously applied to many others, including MPI-1, MPI-2, Open MP, MLP, CoArray Fortran, HPF and other parallel programming models.

By providing access to cacheable memory in the manner described above, generated code from existing compilers will access the remote memory efficiently since ordinary cacheable loads and stores are used to reference remote memory. Also, the invention provides more flexibility in writing algorithms that balance load between cooperating parallel processes, because work stealing can be done in-place rather than by copying the work, operating on it, and putting it back. In addition, existing compilers can generate efficient code for accessing small-strided transfers by built-in processor queues that allow multiple loads or stores to be operating concurrently, where each stride is a gap between consecutive memory words that are accessed.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of implementing a multi-processing programming model, comprising:
   providing cacheable memory access to shared memory by cooperating processes executing on multiple hosts, the hosts using a message passing interface for communication between processes; and
   transferring messages through mapped memory regions by a copy request from a user process for an inter-host transfer of a cache line of memory initiated by an object program generated without specifically requesting the inter-host transfer.

2. A method as recited in claim 1,
   wherein each of the multiple hosts includes at least one processor executing at least one of the cooperating processes, and
   wherein said providing can make all memory assigned to any of the cooperating processes accessible to any of the processes.

3. A method as recited in claim 2, wherein said providing includes defining pointers to arbitrary data structures from arbitrary processes in multiple hosts.

4. A method as recited in claim 3, wherein the pointers are unique across all of the hosts.

5. A method as recited in claim 2, further comprising mapping portions of the memory upon initial start up of each process for subsequent inter-host access.

6. A method as recited in claim 5, wherein said mapping of portions of the memory includes mapping segments of virtual memory fixed in size and changeable in size.

7. A method as recited in claim 6, wherein said mapping of portions of the memory includes mapping at least one of a static area, private heap, symmetric heap, stack area, and internal buffers for each process in each host.

8. A method as recited in claim 1 wherein said providing includes defining pointers that are unique across all of the hosts.

9. A method as recited in claim 1, wherein said transferring includes short-strided transfers or irregularly structured data areas, where each stride is a gap between consecutive memory words that are accessed.

10. A method as recited in claim 1, wherein said providing comprises
    responding to a share request from a first process to share an area of memory in virtual address space of the first process by setting data indicating that the area of memory is to be shared and restrictions on access to the area of memory;
    responding to an access permission request from a second process for permission to access the area of memory by the second process by determining whether the second process meets the restrictions on access; and
    mapping the area of memory into virtual address space of the second process if permission is granted.

11. A method as recited in claim 10, wherein said setting of restrictions on access to the area of memory is based on user configurable permission control.

12. A method as recited in claim 10, wherein said setting, determining and mapping are performed in response to calls to library functions in user memory space.

13. A method of implementing a multi-processing programming model, comprising:
    providing cacheable memory access to shared memory by cooperating processes executing on multiple hosts, said providing including
    responding to a share request from a first process to share an area of memory in virtual address space of the first process by setting data indicating that the area of memory is to be shared and restrictions on access to the area of memory, responding to an access permission request from a second process for permission to access the area of memory by the second process by determining whether the second process meets the restrictions on access, mapping the area of memory into virtual address space of the second process if permission is granted, and responding to a fault generated upon an initial attempt to access the area of memory by handling the fault to finish mapping at least a portion of data from the area of memory of the first process into virtual address space of the second process, so that a user load/store operation will succeed.

14. A method of implementing a multi-processing programming model, comprising:

providing cacheable memory access to shared memory by cooperating processes executing on multiple hosts, said providing including responding to a share request from a first process to share an area of memory in virtual address space of the first process by setting data, in response to calls to library functions in user memory space, indicating that the area of memory is to be shared and restrictions on access to the area of memory, where the share request includes returning a handle identifying the area of memory in the virtual address space of the first process and the first process uses inter-host communication to transmit the handle to a second process, responding to an access permission request, from the second process and including a get library function call using the handle as an argument, for permission to access the area of memory by the second process by determining, in response to calls to library functions in user memory space, whether the second process meets the restrictions on access, and returning an identifier if permission to access is determined, and mapping, in response to calls to library functions in user memory space, the area of memory into virtual address space of the second process if permission is granted, where said mapping includes responding to an attach library function call using the identifier as an argument.

15. A method as recited in claim 14, wherein the handle is unique across all of the hosts.

16. At least one computer readable medium storing at least one program to control a computer system to implement a multi-processing programming model according to a method comprising:

providing cacheable memory access to shared memory by cooperating processes executing on multiple hosts, the hosts using a message passing interface for communication between processes; and transferring messages through mapped memory regions by a copy request from a user process for an inter-host transfer of a cache line of memory initiated by an object program generated without specifically requesting the inter-host transfer.

17. At least one computer readable medium as recited in claim 16, wherein each of the multiple hosts includes at least one processor executing at least one of the cooperating processes, and wherein said providing can make all memory assigned to any of the cooperating processes accessible to any of the processes.

18. At least one computer readable medium as recited in claim 17, wherein said providing includes defining pointers to arbitrary data structures from arbitrary processes in multiple hosts.

19. At least one computer readable medium as recited in claim 18, wherein the pointers are unique across all of the hosts.

20. At least one computer readable medium as recited in claim 17, further comprising mapping portions of the memory upon initial start up of each process for subsequent inter-host access.

21. At least one computer readable medium as recited in claim 20, wherein said mapping of portions of the memory includes mapping segments of virtual memory fixed in size and changeable in size.

22. At least one computer readable medium as recited in claim 21, wherein said mapping of portions of the memory includes mapping at least one of a static area, private heap, symmetric heap, stack area, and internal buffers for each process in each host.

23. At least one computer readable medium as recited in claim 16, wherein the pointers are unique across all of the hosts.

24. At least one computer readable medium as recited in claim 16, wherein said transferring includes short-strided transfers or irregularly structured data areas, where each stride is a gap between consecutive memory words that are accessed.

25. At least one computer readable medium as recited in claim 16, wherein said providing comprises responding to a share request from a first process to share an area of memory in virtual address space of the first process by setting data indicating that the area of memory is to be shared and restrictions on access to the area of memory;

responding to an access permission request from a second process for permission to access the area of memory by the second process by determining whether the second process meets the restrictions on access; and mapping the area of memory into virtual address space of the second process if permission is granted.

26. At least one computer readable medium as recited in claim 25, wherein said setting of restrictions on access to the area of memory is based on user configurable permission control.

27. At least one computer readable medium as recited in claim 25, wherein said setting, determining and mapping are performed in response to calls to library functions in user memory space.

28. At least one computer readable medium as recited in claim 25, further comprising disabling access to the area of memory in the virtual address space of the first process in response to one of requesting revocation of permission to access by the first process and requesting detachment of the area of memory by the second process.

29. At least one computer readable medium as recited in claim 28, wherein said requesting detachment is performed automatically upon termination of the second process.

30. At least one computer readable medium as recited in claim 28, wherein said responding to the share request includes returning a handle identifying the area of memory in the virtual address space of the first process;

wherein said requesting revocation includes calling a remove library function with the handle as an argument, and wherein said requesting detachment includes calling a detach library function using a virtual address, corresponding to the handle, as a argument.

31. At least one computer readable medium as recited in claim 28, further comprising requesting release of the area of memory by the second process when access is no longer needed.

32. At least one computer readable medium storing at least one program to control a computer system to implement a multi-processing programming model according to a method comprising:

provid ing cacheable memory access to shared memory by cooperating processes executing on multiple hosts, said providing including responding to a share request from a first process to share an area of memory in virtual address space of the first process by setting data indicating that the area of memory is to be shared and restrictions on access to the area of memory;

responding to an access permission request from a second process for permission to access the area of memory by the second process by determining whether the second process meets the restrictions on access;

mapping the area of memory into virtual address space of the second process if permission is granted; and responding to a fault generated upon an initial attempt to access the area of memory by handling the fault to finish mapping at least a portion of data from the area of memory of the first process into virtual address space of the second process, so that a user load/store operation will succeed.

33. At least one computer readable medium storing at least one program to control a computer system to implement a multi-processing programming model according to a method comprising:

providing cacheable memory access to shared memory by cooperating processes executing on multiple hosts, said providing including responding to a share request from a first process to share an area of memory in virtual address space of the first process by setting data, in response to calls to library functions in user memory space, indicating that the area of memory is to be shared and restrictions on access to the area of memory, where the share request includes returning a handle identifying the area of memory in the virtual address space of the first process and the first process uses inter-host communication to transmit the handle to a second process, responding to an access permission request, from the second process and including a get library function call using the handle as an argument, for permission to access the area of memory by the second process by determining, in response to calls to library functions in user memory space, whether the second process meets the restrictions on access, and returning an identifier if permission to access is determined, and mapping, in response to calls to library functions in user memory space, the area of memory into virtual address space of the second process if permission is granted, where said mapping includes responding to an attach library function call using the identifier as an argument.

34. At least one computer readable medium as recited in claim 33, wherein the handle is unique across all of the hosts.

35. A computer system implementing a multi-processing programming model, comprising:

cacheable memory; and processors programmed to provide access to said cacheable memory by cooperating processes executing on multiple hosts using a message passing interface for communication between the cooperating processes through mapped memory regions via an inter-host transfer of a cache line of memory that is initiated by an object program generated without specifically requesting the inter-host transfer.

36. A computer system as recited in claim 7, wherein said processors are further programmed to define pointers that are unique across all of the hosts.

37. A system implementing a multi-processing programming model, comprising:

cacheable memory; and means for providing access to said cacheable memory by cooperating processes executing on multiple hosts using a message passing interface for communication between the cooperating processes through mapped memory regions via an inter-host transfer of a cache line of memory that is initiated by an object program generated without specifically requesting the inter-host transfer.

* * * * *